(12) United States Patent
Sun

(10) Patent No.: US 7,647,585 B2
(45) Date of Patent: Jan. 12, 2010

(54) METHODS AND APPARATUS TO DETECT PATTERNS IN PROGRAMS

(75) Inventor: Mingqiu Sun, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 510 days.

(21) Appl. No.: 10/424,356

(22) Filed: Apr. 28, 2003

(65) Prior Publication Data

US 2004/0216013 A1    Oct. 28, 2004

(51) Int. Cl.
G06F 9/44    (2006.01)
G06F 9/45    (2006.01)

(52) U.S. Cl. ..................... 717/128; 717/131; 717/154
(58) Field of Classification Search .................. None
See application file for complete search history.

(56) References Cited

U.S. PATENT DOCUMENTS

| | | | |
|---|---|---|---|
| 5,606,685 A | 2/1997 | Frandeen | |
| 5,850,632 A | 12/1998 | Robertson | |
| 6,055,650 A * | 4/2000 | Christie | 714/39 |
| 6,237,065 B1 | 5/2001 | Banerjia et al. | |
| 6,415,359 B1 | 7/2002 | Kimura et al. | |
| 6,470,297 B1 | 10/2002 | Ford | |
| 6,571,318 B1 | 5/2003 | Sander et al. | |
| 6,622,168 B1 | 9/2003 | Datta | |
| 6,751,707 B2 | 6/2004 | Magoshi | |
| 6,752,335 B2 | 6/2004 | Levia | |
| 6,971,092 B1 * | 11/2005 | Chilimbi | 717/158 |
| 7,007,001 B2 * | 2/2006 | Oliver et al. | 706/21 |
| 7,043,608 B2 | 5/2006 | Sun | |
| 2001/0042172 A1 | 11/2001 | Duesterwald et al. | |
| 2001/0052064 A1 * | 12/2001 | Chaudhry et al. | 712/225 |
| 2002/0152361 A1 | 10/2002 | Dean et al. | |
| 2003/0105942 A1 * | 6/2003 | Damron et al. | 712/216 |
| 2003/0140203 A1 | 7/2003 | Jourdan et al. | |
| 2004/0103408 A1 * | 5/2004 | Chilimbi et al. | 717/140 |
| 2004/0111708 A1 * | 6/2004 | Calder et al. | 717/131 |
| 2004/0154011 A1 * | 8/2004 | Wang et al. | 717/158 |
| 2004/0158818 A1 | 8/2004 | Smith et al. | |
| 2004/0216013 A1 | 10/2004 | Sun | |

OTHER PUBLICATIONS

T.Sherwood et al., "Phase Tracking and Prediction", technical report CS2002-0710, UC San Diego, Jun. 23, 2002, as retrieved on the Web at "http://www-cse.usd.edu/Dienst/UI/2.0/Describe/ncstrl.ucsd_cse/CS2002-0710" on Sep. 30, 2006.*

(Continued)

*Primary Examiner*—Tuan Q Dam
*Assistant Examiner*—Thuy Dao
(74) *Attorney, Agent, or Firm*—Hanley, Flight & Zimmerman, LLC

(57) ABSTRACT

Methods and apparatus are disclosed to detect patterns in an executing program. An example method disclosed herein develops a trace of a program; identifies a sequence of program states from the trace by comparing intersecting sets of data at least partially indicative of addresses associated with the trace; develops a set of probabilities of transitioning between pairs of program states in the series of program states; identifies a current program state of the program; and predicts a next program state of the program based on the current program state and at least one of the probabilities.

45 Claims, 10 Drawing Sheets

OTHER PUBLICATIONS

"Phase Tracking and Prediction", Sherwood et al., ACM SIGARCH Computer Architecture News, vol. 31, Issue 2, (May 2003), pp. 336-339, ISSN:0163-5964, retrieved from http://portal.acm.org on May 8, 2007.*

"Reports Listed by Author", pp. 1-12, retrieved at www.cs.ucsd.edu/Dienst/UI/2.0/ListAuthors/A-Z?authority=ncstrl.ucsd.*

"Reports Listed by Year", pp. 1-4, retrieved at www.cse.ucsd.edu/Dienst/UI/2.0/ListYears/1999-2005?/.*

Phase Tracking and Prediction technical report link, CS2002-0710, dated Jun. 23, 2002, retrieved at www.cse.ucsd.edu/Dienst/UI/2.0/Describe/ncstrl.ucsd_cse/CS2002-0710, pp. 1-2.*

"On the robustness of entropy-based similarity measures in evaluation of subcategorization acquisition systems", Korhonen et al., Aug. 2002, pp. 1-7. Online retrieved at <http://delivery.acm.org/10.1145/1120000/1118867/p14-korhonen.pdf>.*

"Measuring system normality", Burgess et al., May 2002, pp. 125-160. Online retrieved at <http://delivery.acm.org/10.1145/510000/507054/p125-burgess.pdf>.*

"Maximum entropy estimation for feature forests", Miyao et al., Mar. 2002, pp. 292-297. Online retrieved at <http://delivery.acm.org/10.1145/1290000/1289214/p292-miyao.pdf>.*

"A comparison of algorithms for maximum entropy parameter estimation", R. Malouf, Aug. 2002, pp. 1-7. Online retrieved at <http://delivery.acm.org/10.1145/1120000/1118871/p18-malouf.pdf>.*

Doug Joseph et al., "*Prefetching using Markov Predictors*", 1997 Proceedings of the International Symposium on Computer Architecture (ISCA '97), Jun. 1997, Denver Colorado.

Ashutosh S. Dhodapkar et al., "*Managing Multi-Configuration Hardware via Dynamic Working Set Analysis*", May 2002.

Trishul M. Chilimbi et al., "*Dynamic Hot Data Stream Prefetching for General-Purpose Programs*", PLDI-2002, May 2002.

Mingqiu Sun et al., "*Entropy-based Characterization of Program Phase Behaviors*". Feb. 2004, Madrid Spain.

S. Dhodapkar et al., "*Comparing Program Phase Detection Techniques*", Micro-2003, 2003.

V. Bala et al., "*Dynamo: A transparent dynamic optimization system*", PLDI'2000, Jun. 2000.

B. Balasubramonian et al., "*Memory Hierarchy Reconfiguration for Energy and Performance in General Purpose Architectures*", Micro-2000, Dec. 2000.

J. E. Smith et al., "*Dynamic Microarchitecture Adaptation via Co-designed Virtual Machines*", ISSCC-2002, Feb. 2002.

M. Huang et al., "*Positional Adaptation of Processors: Application to Energy Reduction*", ISCA-2003, Jun. 2003.

T. Sherwood et al., "*Phase Tracking and Prediction*", ISCA-2003, Jun. 2003.

T. Sherwood et al., "*Automatically Characterizing Large Scale Program Behavior*", ASPLOS-2002, Oct. 2002.

C.E. Shannon, "*A Mathematical Theory of Communication*", Bell Syst. Tech. J., 27, 379-423, 623-656. Jul. and Oct. 1948.

*Standard Performance Evaluation Corperation* (SPEC) JBB2000 [online]. SPEC [retrieved on May 11, 2004]: Retrieved from the Internet: <URL: http://vww.spec.org/jbb2000/>. 2 pages.

*Standard Performance Evaluation Corperation* (SPEC) JBB2000 [online]. SPECjAppServer [retrieved on May 14, 2004]: Retrieved from the Internet: <URL: http://www.spec.org/jAppServer2002/>, 2 pages.

*Dinero IV Trace-Driven Uniprocessor Cache Simulator*: [retrieved on May 14, 2004]: Retrieved from the Internet: <URL: http://www.cs.wisc.edu/~markhill/DineroIV/>, 2 pages.

Hazelwood et al., *Code Cache Management Schemes for Dynamic Optimizers*, Proceedings of the Sixth Annual Workshop on Interaction between Compilers and Computer Architectures (INTERACT'02), 2002, 9 pages.

Sherwood et al., Abstract for Phase Tracking and Predictions, http://web.archive.org/web/20021119050935/http://www-cse.ucsd.edu/Dienst/UI/2.0/Describe/ncstrl.ucsd_cse/CS2002-0710, Nov. 19, 2002.

Chinese Office action for corresponding Chinese Patent Application No. 03157926.4 dated Apr. 7, 2006 (6 pages).

English Translation of Chinese Office action for corresponding Chinese Patent Application No. 03157926.4 dated Apr. 7, 2006 (8 pages).

* cited by examiner

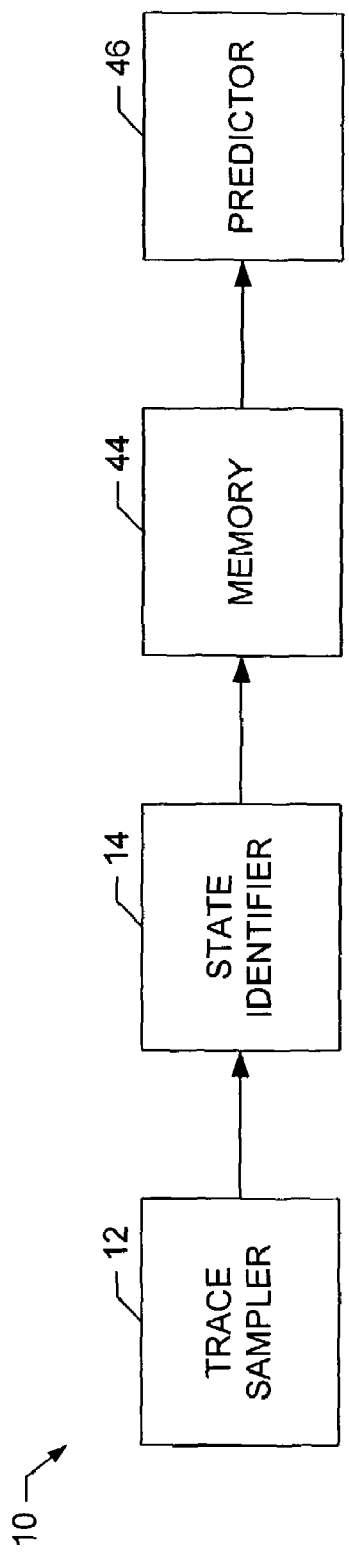
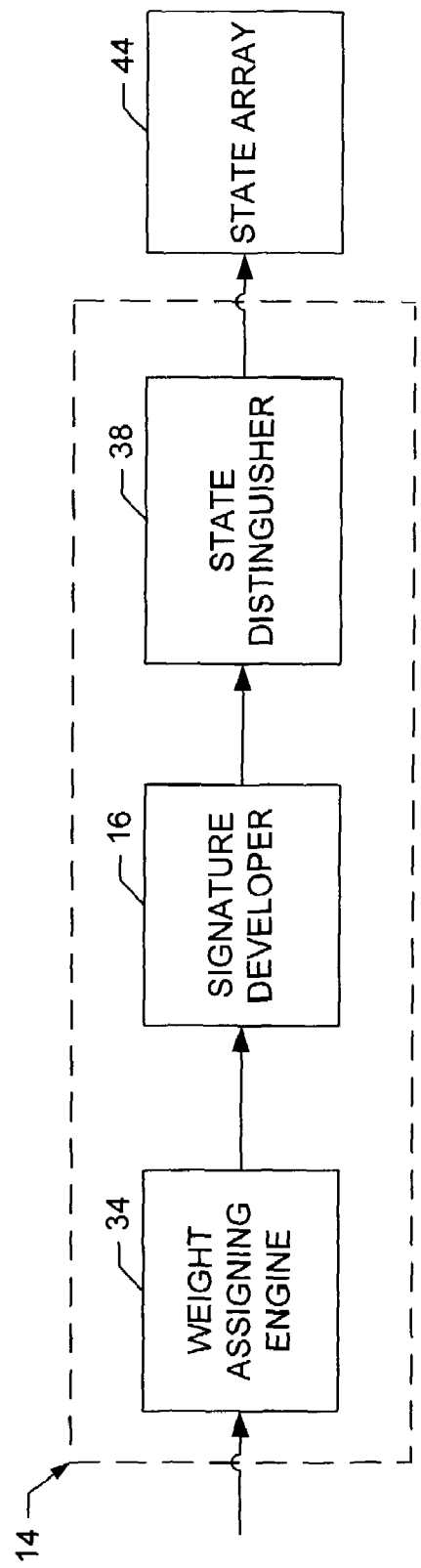
FIG. 1
FIG. 2

| STATE SIGNATURE: | | | 0101100101110 | | |
|---|---|---|---|---|---|
| AGE: | | | X | | |
| USAGE FREQUENCY: | | | Y | | |
| ENTROPY: | | | Z | | |
| STATE: | A | OCCURRENCE TIMES: | 00:00:00; 00:05:13 | PROBABILITY: | 0.63 |
| STATE: | C | OCCURRENCE TIMES: | 00:02:04; 00:09:42 | PROBABILITY: | 0.12 |
| STATE: | E | OCCURRENCE TIMES: | 00:00:13; 00:02:43 | PROBABILITY: | 0.08 |
| STATE: | G | OCCURRENCE TIMES: | 00:08:06; 00:09:18 | PROBABILITY: | 0.05 |
| STATE: | L | OCCURRENCE TIMES: | 00:10:03 | PROBABILITY: | 0.02 |
| STATE: | M | OCCURRENCE TIMES: | 00:07:53 | PROBABILITY: | 0.02 |
| . . . | . . . | . . . | . . . | . . . | . . . |
| . . . | . . . | . . . | . . . | . . . | . . . |
| . . . | . . . | . . . | . . . | . . . | . . . |
| STATE: | V | OCCURRENCE TIMES: | 00:13:31; 00:15:37 | PROBABILITY: | 0.01 |

FIG. 5

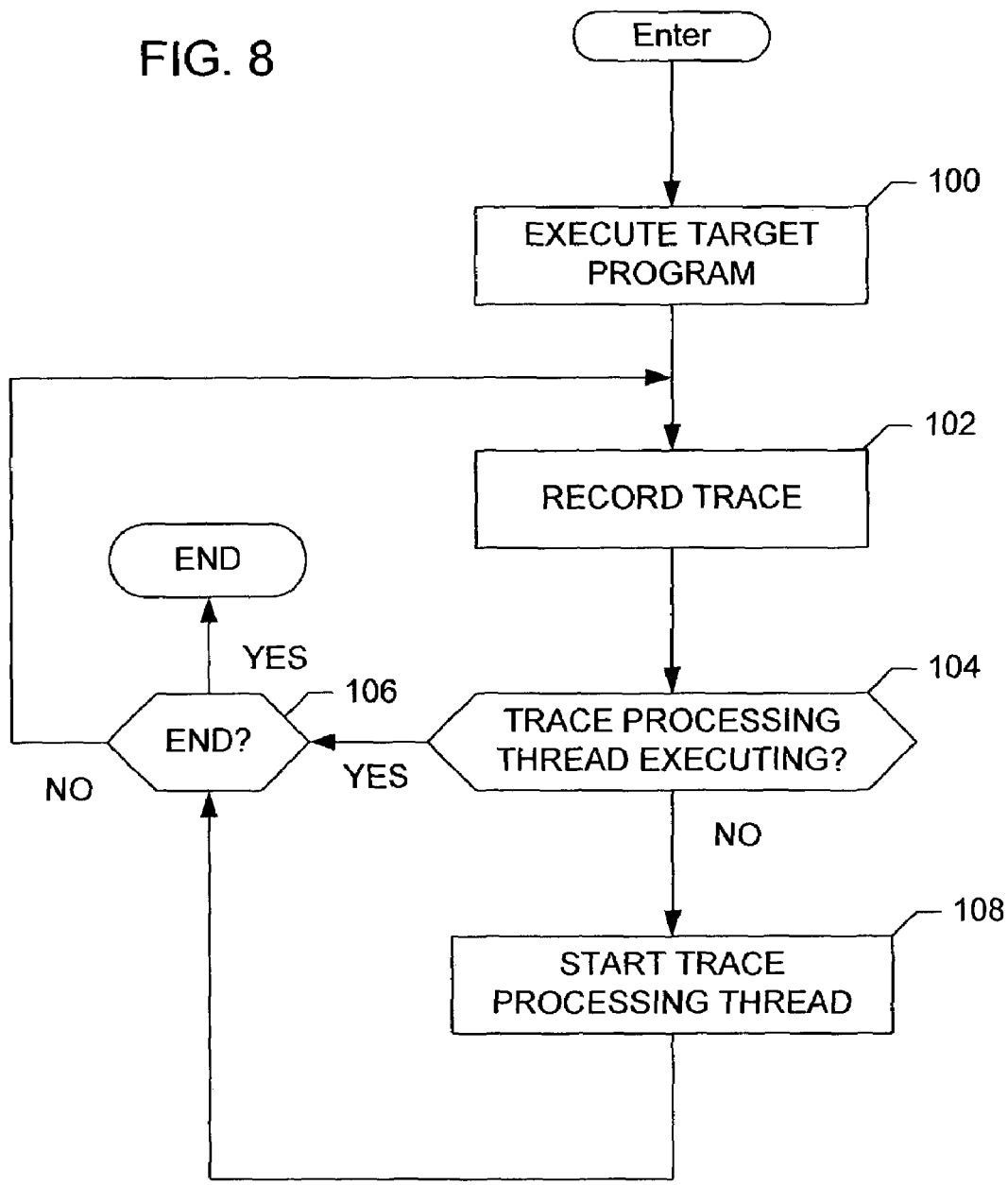

METHODS AND APPARATUS TO DETECT PATTERNS IN PROGRAMS

FIELD OF THE DISCLOSURE

This disclosure relates generally to program management, and, more particularly, to methods and apparatus to detect patterns in programs.

BACKGROUND

Programs executed by computers and other processor based devices typically exhibit repetitive patterns. It has long been know that identifying such repetitive patterns provides an opportunity to optimize program execution. For example, software and firmware programmers have long taken advantage of small scale repetitive patterns through the use of iterative loops, etc. to reduce code size, control memory allocation and perform other tasks seeking to optimize and streamline program execution.

Recently, there has been increased interest in seeking to identify larger scale repetition patterns in complicated workloads such as, for example, managed run-time environments and other server-based applications as a mechanism to optimize handling of those workloads. For instance, it is known that a workload may be conceptualized as a series of macroscopic transactions. As used herein, the terms macroscopic transaction and sub-transaction refer to a business level transaction and/or an application software level transaction. For instance, the workload of a server at an Internet retailer such as Amazon.com may be conceptualized as an on-going sequence of macroscopic transactions and sub-transactions such as product display, order entry, order processing, customer registration, payment processing, etc. Moving to a more microscopic level, each of the macroscopic transactions in the workload may be seen as a series of program states. It is desirable to optimize the execution of workloads by, for example, reducing the time it takes the hosting computer to transition between and/or execute macroscopic transactions and/or program states. Therefore, there is an interest in identifying repetition patterns of program states in macroscopic transactions in the hope of predicting program state transitions, optimizing the execution of macroscopic transactions and/or program states, and increasing the throughput of the workload associated with such transactions.

There have been attempts to exploit repetitive structures such as loops to, for example, prefetch data to a cache. However, those prior art methodologies have been largely limited to highly regular and simple workloads such as execution of scientific codes. Effectively predicting program states and/or macroscopic transactions for larger, more complicated workloads remains an open problem.

BRIEF DESCRIPTION OF THE DRAWINGS

FIG. 1 is a schematic illustration of an example apparatus to detect patterns in programs.

FIG. 2 is a more detailed schematic illustration of the example state identifier of FIG. 1.

FIG. 5 illustrates an example data structure which may be created for each identified state in the program.

FIG. 8 is a flow chart illustrating example machine readable instructions for implementing the trace sampler of the apparatus of FIG. 1.

DETAILED DESCRIPTION

Figure 3:
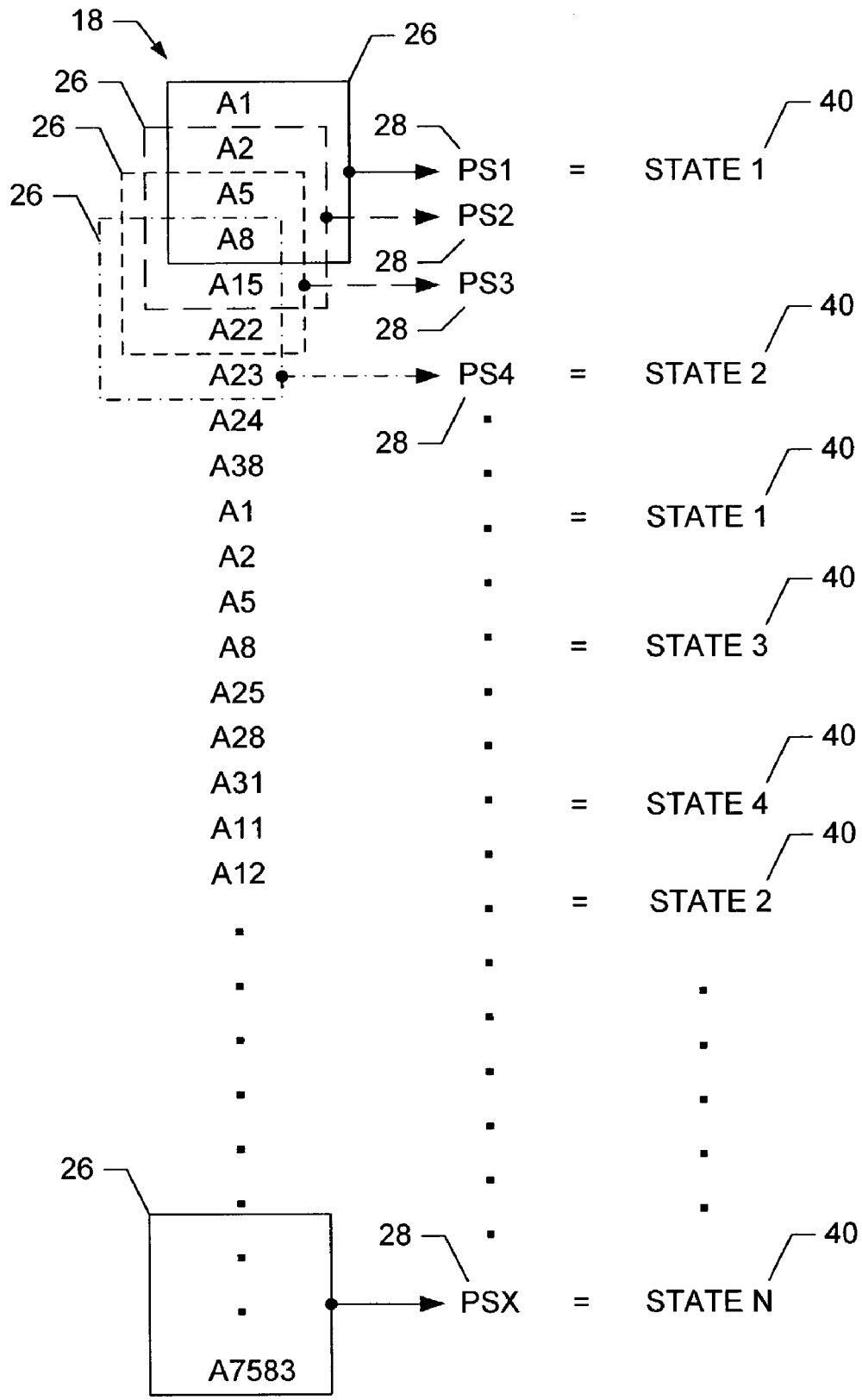
FIG. 3 is a schematic illustration of an example trace.

As mentioned above, real world server applications typically exhibit repetitive behaviors. These repetitive behaviors are usually driven by local or remote clients requesting performance of tasks or business transactions defined by the application program interface (API) of the host site. Since the range of tasks available to the clients is limited, the client calls into the API manifest themselves as repetitive program execution patterns on the hosting server. As explained below, this type of repetitiveness provides efficiency opportunities which may be exploited through microprocessor architecture and/or software.

The basic unit of repetition within these repetitive program execution patterns is a macroscopic transaction or sub-transaction. A macroscopic transaction or sub-transaction may be thought of as one pathlength measured by instructions. The pathlength of such a transaction or sub-transaction is typically, for example, in the range of $10^4$ to $10^6$ instructions.

Each transaction or sub-transaction includes one or more program states. A program state is defined as a collection of information (e.g., a series of memory addresses and/or a series of instruction addresses) occurring in a given time window. A program state may be a measurement-dependent and tunable property. On the other hand, a transaction or a sub-transaction is typically an intrinsic property of a workload.

FIG. 1 is a schematic illustration of an example apparatus 10 to predict program states of an executing program and/or to identify macroscopic transactions of the program. For the purpose of developing a trace of a program of interest, the apparatus 10 is provided with a trace sampler 12. The trace sampler 12 operates in a conventional fashion to develop any type of trace of the program of interest. For example, the trace sampler 12 may employ a hardware-counter such as a processor counter and/or software instrumentation such as managed run-time environment (MRTE) instrumentation to gather trace data from the executing program. For instance, the trace sampler 12 may capture the instruction addresses appearing in the program counter of a processor to create an instruction address trace. By way of another example, the trace sampler 12 may snoop an address bus associated with the cache of a processor to create a memory address trace. Persons of ordinary skill in the art will readily appreciate that many other techniques can be used to create the same or different types of traces. For instance, the trace sampler 12 could alternatively be configured to create a basic block trace.

In order to identify a sequence of program states from the trace generated by the trace sampler 12, the apparatus 10 is further provided with a state identifier 14. As will be appreciated by persons of ordinary skill in the art, the state identifier 14 may identify the states within the trace created by (or being created by) the trace sampler 12 in any number of ways. In the illustrated example, the state identifier 14 identifies the program states by comparing adjacent sets of data at least partially indicative of entries appearing in the trace. To make this comparison more manageable, the illustrated state identifier 14 translates the sets into bit vectors which function as short hand proxies for the data in the sets. The illustrated state identifier 14 then compares the bit vectors of adjacent sets and determines if the difference between the bit vectors is sufficient to indicate that a new state has occurred. Each of the sets of data may comprise sequential groups of entries in the trace. Either all of the entries in the trace may be used, or a subset of the entries may be used (e.g., every tenth entry may be used) to create the sets. Further, either a fraction of the entries selected to be in the set (e.g., the last eight bits) or the entire portion of the entry (e.g., all of the bits in the entry) may be used to create the bit vectors. Persons of ordinary skill in the art will readily appreciate that adjusting the resolution of the sets (e.g., by adjusting the number of entries skipped in creating the sets and/or by adjusting the amount or location of the bits of the entries in the trace that are used to create the bit vectors), may adjust the identities of the program states that are identified by the state identifier 14. Thus, the program state definitions are measurement-dependent and tunable.

An example state identifier 14 is shown in FIG. 2. In the illustrated example, the state identifier 14 includes a signature developer 16 to develop possible state signatures from the sets of entries in the trace. To better illustrate the operation of the signature developer 16, consider the example trace shown in FIG. 3. In the example of FIG. 3, the trace 18 comprises a sequential series of entries representative in some fashion of a characteristic of the computer and/or a component thereof that changes over time as a result of executing the program of interest. For example, the entries may be instruction addresses appearing in the program counter of a processor, memory addresses appearing on an address bus of the cache associated with the processor, or any other recordable characteristic in the computer that changes as a result of executing the program. Persons of ordinary skill in the art will appreciate that the entries may be complete addresses, portions of complete addresses, and/or proxies for complete or partial addresses. In view of the broad range of possibilities for the types of data logged to create the entries of the trace 18, FIG. 3 generically describes these entries by the symbol "A" followed by a number. The number following the symbol "A" serves to uniquely distinguish the entries. To the extent execution of the program of interest causes the monitored characteristic used to create the trace to have the same value two or more times, the trace 18 will include the same entry two or more times (e.g., entry A5 appears twice in the trace 18). The number following the symbol "A" may indicate a relative position of the entry relative to the other entries. For example, if the trace 18 is an instruction address trace, each number following the letters may represent a location in memory of the corresponding address. For simplicity of explanation, unless otherwise noted, the following example will assume that the trace 18 is an instruction address trace reflecting the full memory addresses of the instructions executed by a processor running a program of interest.

The primary purpose of the signature developer 16 is to create proxies for the entries in the trace 18. In particular, the entries in the trace 18 may contain a significant amount of data. To convert these entries into a more manageable representation of the same, the signature developer 16 groups the entries into sets 26 and converts the sets 26 into possible state signatures 28. In the illustrated example, the possible state signatures 28 are bit vectors. The sets 26 may be converted into bit vectors 28 as shown in FIG. 4.

Figure 4:
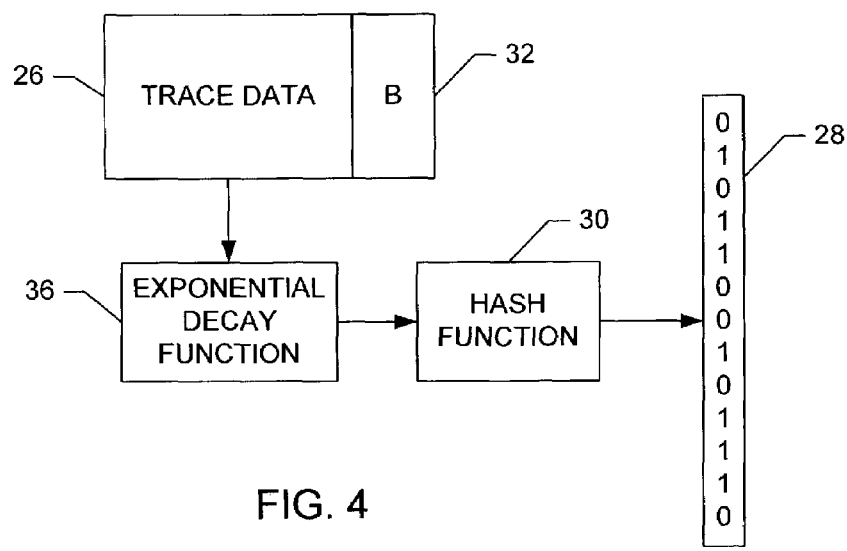
FIG. 4 is a diagram illustrating an example manner in which the signature developer and the weight assigning engine of FIG. 3 may operate to develop signatures.

In the example of FIG. 4 a random hashing function 30 is used to map the entries in a set 26 to an n-bit vector 28. In the example of FIG. 4, the value "B" 32 defines the resolution of the model (e.g., the number of entries in the set 26 that are skipped (if any) and/or processed by the hash function 30 to generate the n-bit vector 28). The basic use of a hash function 30 to map a set of entries from a trace 18 into a bit vector is well known to persons of ordinary skill in the art (see, for example, Dhodapkar & Smith, "Managing Multi-Configuration Hardware Via Dynamic Working Set Analysis") and thus, in the interest of brevity, will not be further explained here. The interested reader can refer to any number of sources, including, for example, the Dhodapkar & Smith article mentioned above, for further information on this topic.

For the purpose of weighting the members of the sets 26 such that later members have greater weight than earlier members of the set 26 when mapping the set 26 of entries to the bit vector signature 28, the apparatus 10 is further provided with a weight assigning engine 34. As shown in the example mapping function of FIG. 4, the weight assigning engine 34 applies an exponential decay function 36 (e.g., $f_1 = e^{-t/T}$ where t=time and T=half lifetime) to the entries in a set 26 prior to operating on the set 26 with the hashing function 30. The exponential decay function 36 is applied to the entries in the set 26 of entries so that, when the hashing function 30 is used to convert the set 26 into a possible state signature 28, the latest entries in the set 26 have a greater impact on the values appearing in the possible state signature 28 than earlier values in the set 26. Persons of ordinary skill in the art will appreciate that, as with other structures and blocks discussed herein, the weight assigning engine 34 is optional. In other words, the exponential decay function 36 shown in FIG. 4 may be optionally eliminated.

As explained above, the illustrated signature developer 16 operates on sequential sets 26 of the entries appearing in the trace 18 to create a series of bit vectors 28 corresponding to those sets 26. Persons of ordinary skill in the art will readily appreciate that the signature developer 16 may group the entries in the trace 18 into sets 26 in any number of ways. However, in the illustrated example, the signature developer 16 creates the sets 26 such that adjacent sets 26 overlap (i.e., share at least one entry). In other words, the signature developer 16 uses a sliding window to define a series of overlapping sets 26. The number of entries in the trace 18 that are shared by adjacent sets 26 (i.e., the intersection of adjacent sets) may be as small as one element or as large as all but one element (see, for example, the overlapping sets 26 in FIG. 4). In examples in which the signature developer 16 creates adjacent intersecting sets 26, it is particularly advantageous to also use the weight assigning engine 34 such that the possible state signatures 28 created by the signature developer 16 are more responsive to the newer non-overlapping entries than to the overlapping entries and the older non-overlapping entries.

In order to identify program states based on the possible state signatures 28, the apparatus 10 is further provided with a state distinguisher 38. In the illustrated example, the state distinguisher 38 begins identifying program states by selecting one of the possible state signatures 28 as a first state signature 40 (e.g., State 1 in FIG. 3) to provide a reference point for the remainder of the analysis. Typically, the first possible state signature 28 (e.g., PS1 in FIG. 3) in the sequence of possible state signatures (e.g., PS1-PSN) is, by default, selected as the first state signature 40, but persons of ordinary skill in the art will readily appreciate that this selection is arbitrary and another one of the possible state signatures 28 (e.g., PS2-PSN) may alternatively be used as the first state signature 40.

Once a first state signature 40 is selected, the state distinguisher 38 compares the first state signature 40 to a next subsequent one of the possible state signatures 28 (e.g., PS2). For example, if the first state signature 40 is the first possible state signature, the first state signature 40 may be compared to the second possible state signature PS2 in the list of possible state signatures 28. If the next subsequent state signature 28 (e.g., PS2) differs from the first state signature 40 by at least a predetermined amount, there has been sufficient change in the measured parameter used to create the trace 18 to designate the corresponding program as having entered a new program state. Accordingly, the state distinguisher 38 identifies the subsequent possible state signature 28 (e.g., PS2) as a second state signature.

If, on the other hand, the subsequent state signature 28 (e.g., PS2) does not differ from the first state signature 40 by at least a predetermined amount, there has not been sufficient change in the measured parameter used to create the trace 18 to designate the corresponding program as having entered a new program state. Accordingly, the state distinguisher 38 discards the possible state signature 28 (e.g., PS2), skips to the next possible state signature 28 (e.g., PS3), and repeats the process described above by comparing the first state signature 40 to the next possible state signature 28 (e.g., PS3). The state distinguisher 38 continues this process of sequentially comparing possible state signatures 28 (e.g., PS2-PSN) to the first state signature 40 until a possible state signature 28 (e.g., PS4) is identified that differs from the first state signature 40 by at least the predetermined amount. When such a possible state signature (e.g., PS4) is identified, the state distinguisher 38 designates that possible state signature (e.g., PS4) as the second state signature (e.g., State 2). All intervening possible state signatures 28 (e.g., PS2-PS3) are not used again, and, thus, may be discarded.

Once the second state (e.g., State 2) is identified, the state distinguisher 38 then begins the process of comparing the second state signature (e.g., PS4) to subsequent possible state signatures (e.g., PS5, etc.) to identify the third state (e.g., State 3) and so on until all of the possible state signatures (e.g., PS2-PSN) have been examined and, thus, all of the program states (State 1-State N) occurring during the current execution of the program have been identified. Example program states (i.e., State 2-State N) appearing after the first program state 40 are shown in FIG. 3. As shown in that example, any number of program states may occur and/or reoccur any number of times depending on the program being analyzed.

Persons of ordinary skill in the art will appreciate that there are many possible ways to compare the state signatures (e.g., State 1-State N) to subsequent possible state signatures (e.g., PS2-PSN) to determine if a new program state has been entered. Such persons will further appreciate that there are many different thresholds that may be used as the trigger for determining that a new state has been entered. The threshold chosen is a determining factor in the number and definitions of the states found in the program. In the illustrated example, the threshold difference required between signatures to declare a new program state is the Hamming distance. Thus, if the difference between a state signature (e.g., State 1) and a possible state signature (e.g., PS2) satisfies the following equation, then a new program state has been entered:

$$\Delta = |\text{State Signature XOR Possible State Signature}| / |\text{State Signature OR Possible State Signature}|$$

In other words, a new state has been entered in the example implementation if the set of bit values appearing in only one of: (a) the current state signature and (b) a possible state signature (i.e., the set of differences) divided by the set of all members appearing in either (a) the current state signature and/or (b) the possible state signature (i.e., the total set of members (e.g., logic one values appearing in the bit vectors)) is greater than a predetermined value (e.g., $\Delta$).

To manage data associated with the states identified by the state distinguisher 38, the apparatus 10 is further provided with a memory 44 (see FIG. 1). The memory 44 of the illustrated example is configured as a state array including a plurality of state data structures, wherein each data structure corresponds to a unique program state. As will be appreciated by persons of ordinary skill in the art, the state data structures and the state array 44 may be configured in any number of manners. In the illustrated example, the state array 44 is large enough to contain four hundred state data structures and each data structure in the state array includes the following fields: (a) the state signature of the corresponding program state, (b) an age of the corresponding program state, (c) a usage frequency of the corresponding program state, (d) an entropy value of the corresponding state, and (e) a sub-array containing a set of probabilities of transitioning from the corresponding program state to a set of program states.

An example state data structure is shown in FIG. 5. The state signature field may be used to store the bit vector signature (e.g., State 1-State N) of the state corresponding to the data structure. The age field may be used to store a value indicative of the time at which the corresponding state was last entered. Because the state array is finite, the age field may be used as a vehicle to identify stale state data structures that may be overwritten to store data for a more recently occurring state data structure. The usage frequency field may be used to store data identifying the number of times the corresponding state has been entered during the lifetime of the data structure. The entropy value field may be used to store data that may be used to identify the end of a macroscopic transaction. The set of probabilities sub-array may be used to store data indicating the percentage of times program execution has entered program states from the program state corresponding to the state data structure during the lifetime of the state data structure. For example, each data structure may store up to sixteen sets of three fields containing data indicating a name of a program state to which the program state corresponding to the state data structure has transitioned in the past, the relative time(s) at which those transitions have occurred, and the percentage of times that the program state corresponding to the state data structure has transitioned to the state identified in the first field of the set of fields.

In order to determine entropy values associated with the program states identified by the state identifier, the apparatus 10 is further provided with a predictor 46. As explained below, in the illustrated example, the predictor 46 uses the entropy values to identify an end of a macroscopic transaction.

Figure 6:
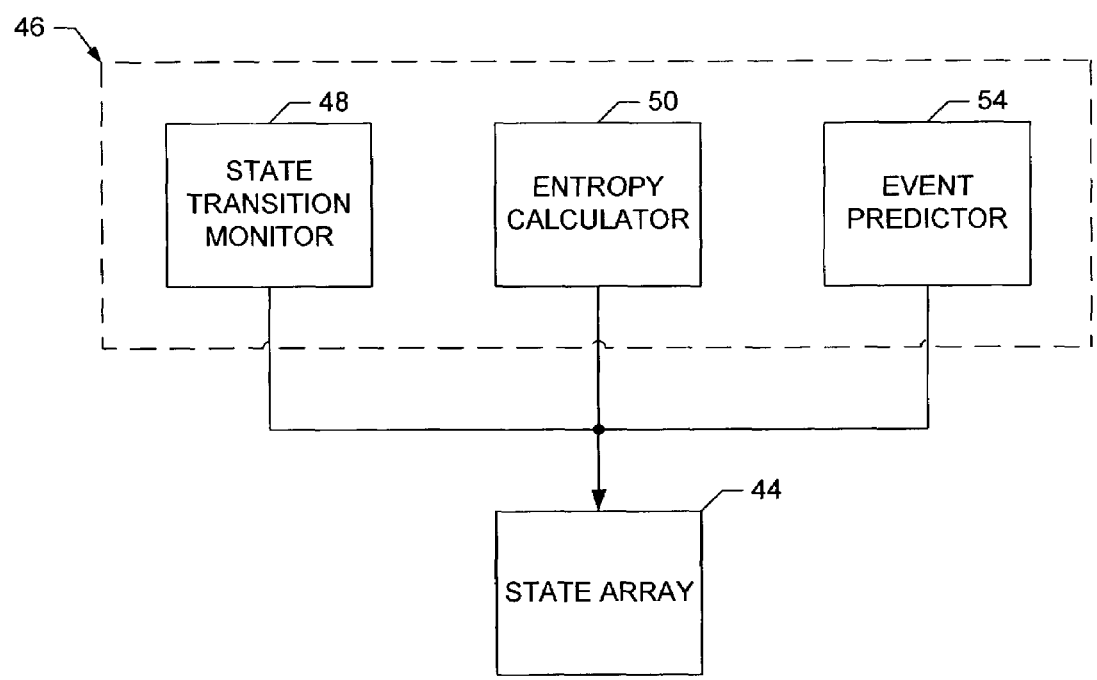
FIG. 6 is a more detailed schematic illustration of the example predictor of FIG. 1.

An example predictor 46 is shown in greater detail in FIG. 6. To calculate probabilities of transitioning from one of the program states to another of the program states, the predictor 46 is provided with a state transition monitor 48. Whenever a program state transition occurs (i.e., whenever the state of the program changes from one state to another), the state transition monitor 48 records the event in the sub-array of the state data structure corresponding to the program state that is being exited. In particular, the state transition monitor 48 records data indicating the name of the array transitioned to and the time (or a proxy for the time) at which the transition occurred. The time (or a proxy for the time) at which the transition occurred is recorded because, in the illustrated example, the state transition monitor 48 calculates the probabilities as exponential moving averages. Thus, instead of merely averaging the entries in the sub-array of the state data structure to calculate the probabilities of transitioning between specific states based on past performance, the state transition monitor 48 weights the entries in the sub-array of the state data structure based on their relative times of occurrence by multiplying those entries by an exponential function. As a result of this approach, entries in the sub-array which occur later in time have greater weight on the probability calculations than entries which occur earlier in time, and the state transition monitor 48 can, thus, identify changing patterns in the probabilities more quickly than an approach using straight moving averages.

To convert the probabilities calculated by the state transition monitor 48 into entropy values, the apparatus 10 is further provided with an entropy calculator 50. The entropy value of a given state is the transitional uncertainty associated with that state. In other words, given the past history of a current state, the entropy value quantifies the informational uncertainty as to which program state will occur when the current program state ends. For instance, for a given program state that has a past history of transitioning to a second program state and a third program state, the entropy calculator 50 converts the probabilities to entropy values for the given program state by calculating a sum of (1) a product of (a) a probability of transitioning from the subject program state to the second program state and (b) a logarithm of the probability of transitioning from the subject program state to the second program state, and (2) a product of (a) a probability of transitioning from the subject program state to the third program state and (b) a logarithm of the probability of transitioning from the subject program state to the third program state. Stated another way, for each state data structure in the state array 44, the entropy converter 50 calculates an entropy value in accordance with the well known Shannon formula:

$$H = -K\Sigma(P_i * \log P_i),$$

where H is the entropy value, K is a constant and $P_i$ is the probability of transitioning from the current state (i.e., the state associated with the state data structure) to state "i" (i.e., the states identified in the sub-array of the data structure of the current state). The entropy value of each state identified in the executing program is stored in the data structure of the corresponding state (see FIG. 5).

In order to predict the next probable program state to be transitioned to from the current state, the predictor 46 further includes an event predictor 54. The event predictor 54 compares the probabilities appearing in the sub-array of the data structure of the current program state to determine the next most probable state or states. The next most probable state(s) are the state(s) that have the highest probability values.

The event predictor 54 also functions to identify a macroscopic transaction based on the entropy value associated with the current program state. Viewed from a macroscopic application logic level, one can observe a link to the calculated entropy value (H), which is a microscopic trace property. When a new business transaction starts, program execution typically follows a relatively well-defined trajectory with low entropy. However as program execution reaches the last program state in a macroscopic transaction, the entropy value spikes as there is maximum uncertainty about the possible next program state the program will transition to. In other words, within a macroscopic transaction, there are typically repetitive sequences of program states. By observing past behavior between program states, one can detect these patterns and use them to predict future behavior. In contrast, the order of macroscopic transactions has a higher degree of randomness then the order of program states within a macroscopic transaction because the order in which macroscopic transactions are executed depends on the order in which requests for transactions are received from third parties and is, thus, substantially random. To make this point clearer, consider an on-line retailer. The server of the on-line retailer receives requests from a number of different customers and serializes those requests in a generally random fashion in a queue. The order in which the requests are handled is, thus, random. However, once the server begins serving a request, it will generally process the entire transaction before serving another transaction from the queue. As a result, the program state at the end of a macroscopic transaction typically has a high entropy value (i.e., there is a high level of uncertainty as to which program state will be entered), because there is a high level of uncertainty as to which macroscopic transaction will follow the current macroscopic transaction that just completed execution. Consequently, the last program state in a macroscopic transaction is characterized by a spike in its entropy value relative to the surrounding entropy values. In other words, the entropy value of the last program state of a macroscopic transaction is typically a relative maximum as compared to the entropy values of the program states immediately proceeding and following the last program state.

The event predictor 54 takes advantage of this characteristic by using this entropy spike as a demarcation mark for the end of a macroscopic transaction. A macroscopic transaction may thus be defined as an ordered sequence of program states with an entropy-spiking ending state. A macroscopic transaction maps to a business or application software transaction, which is an intrinsic property of a workload. The same macroscopic transaction may contain different sets of program states, which are measurement-dependent properties of a workload that can be tuned through the transition threshold value. One caution, however, is that repeatable sub-transactions that may not be significant to high level business logic may also end at a program state exhibiting a spiking entropy value and, thus, may be mis-identified as a macroscopic transaction. This misidentification is not a problem in practical cases such as performance tuning of a program because sub-transactions with large transitional uncertainty behave like transactions for all practical purposes.

As stated above, the event predictor 54 identifies a spike in the entropy values of a series of program states as an end of a macroscopic transaction. Persons of ordinary skill in the art will appreciate that the event predictor 54 may use any number of techniques to identify a spike in the entropy values. For example, the event predictor 54 may compare the entropy value of the current state to the entropy value of the previous state and the entropy value of the following state. If the entropy value of the current state exceeds the entropy value of the previous state and the entropy value of the following state, the entropy value of the current state is a relative maximum (i.e., a spike) and the current state is identified as the end of a macroscopic transaction. Otherwise, it is not a relative maximum and the current state is not identified as the end of a macroscopic transaction.

Figure 7:
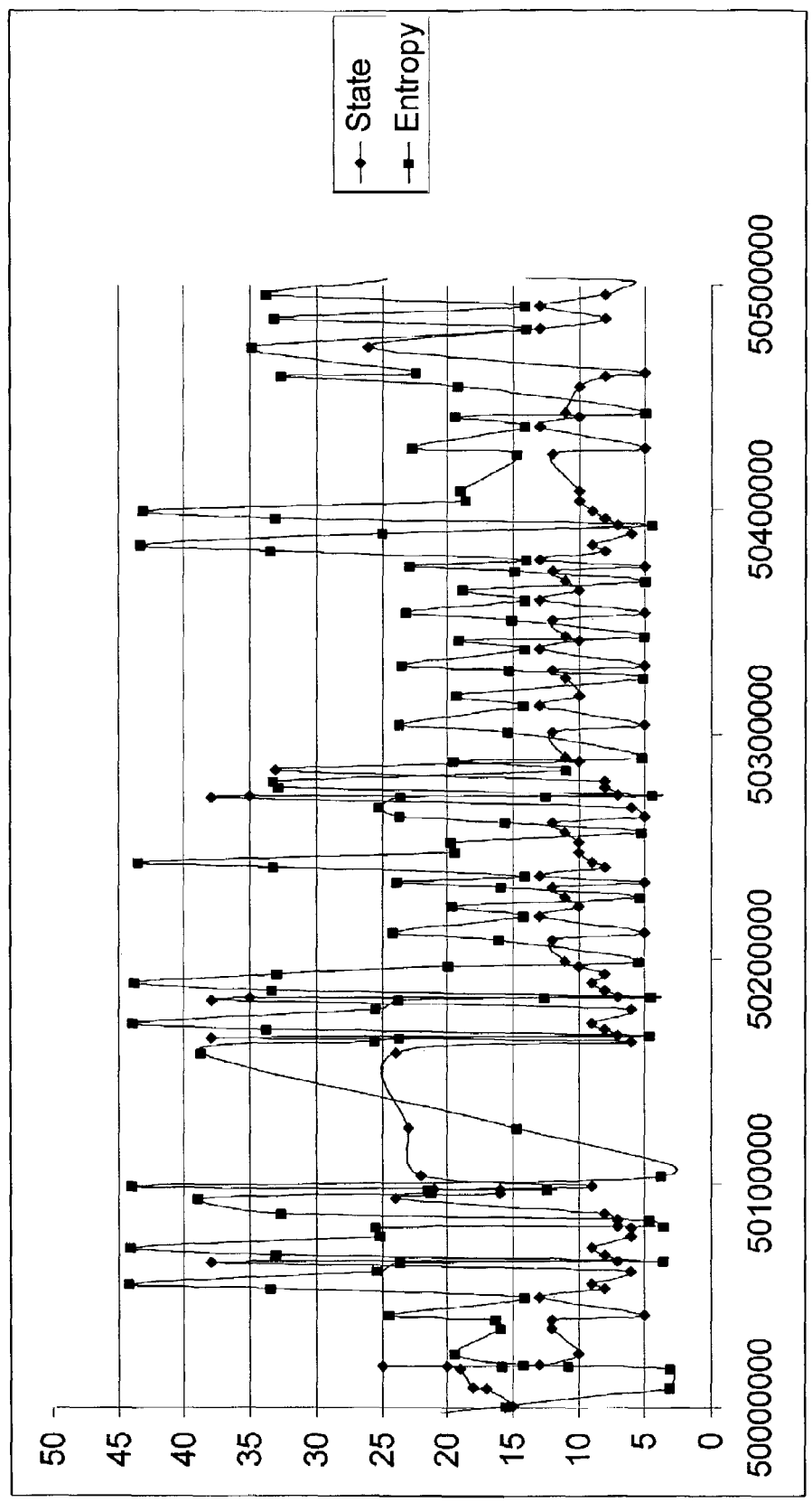
FIG. 7 is a chart graphing example entropy values calculated by the entropy calculator of FIG. 6.

A chart illustrating a graph of example entropy values calculated by the entropy calculator 50 is shown in FIG. 7. In the chart of FIG. 7, instead of using the signatures to index the program states, we use the first discovery time of each program state as its unique index. These first discovery times are used as the ordinates of the Y-axis in FIG. 7. (The ordinates of the Y-axis also represent entropy values as explained below.) Memory accesses are used as the ordinates of the X-axis of FIG. 7. The memory accesses are a proxy to time.

The chart of FIG. 7 includes two graphs. One of the graphs represents the program states that are entered over the time period at issue. The other graph represents the entropy values of the corresponding program states over that same time period. As can be seen by examining FIG. 7, each state in the graph (i.e., each data point represented by a diamond ♦) is positioned in vertical alignment with its corresponding entropy value (i.e., each data point represented by a square ■). As can also be seen in FIG. 7, the entropy values spike periodically. Each of these spikes in the entropy values represents an end of a macroscopic transaction.

Flowcharts representative of example machine readable instructions for implementing the apparatus 10 of FIG. 1 are shown in FIGS. 8 and 9A-9C. In this example, the machine readable instructions comprise a program for execution by a processor such as the processor 1012 shown in the example computer 1000 discussed below in connection with FIG. 10. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the trace sampler 12, the state identifier 14, the predictor 46, the weight assigning engine 34, the signature developer 16, the state distinguisher 38, the state transition monitor 48, the entropy calculator 50, and/or the event predictor 54 could be implemented by software, hardware, and/or firmware. Further, although the example program is described with reference to the flowcharts illustrated in FIGS. 8 and 9A-9C, persons of ordinary skill in the art will readily appreciate that many other methods of implementing the example apparatus 10 may alternatively be used. For example, the order of execution of the blocks may be changed, and/or some of the blocks described may be changed, eliminated, or combined.

The program of FIG. 8 begins at block 100 where the target program begins execution. While the target program executes, the trace sampler 12 creates one or more traces 18 of one or more properties of the executing program (block 102). For example, the trace sampler 12 may generate an instruction address trace, a memory address trace, a basic block trace, and/or any other type of trace. Control proceeds from block 102 to block 104.

If a trace processing thread has already been invoked (block 104), control proceeds from block 104 to block 106. If the trace 18 of the program is complete (block 106), the program of FIG. 8 terminates. Otherwise, if the trace 18 of the program is not complete (block 106), control returns to block 102 where the recording of the trace 18 continues.

If the trace processing thread has not already been invoked (block 104), control proceeds to block 108. At block 108, the trace processing thread is initiated. Control then returns to block 106. As explained above, the program will terminate if the trace 18 is complete (block 106) or continue to generate the trace 18 (block 102) if the trace 18 has not yet been completed. Thus, control continues to loop through blocks 100-108 until the target program stops executing and the trace 18 is complete.

Figure 9A:
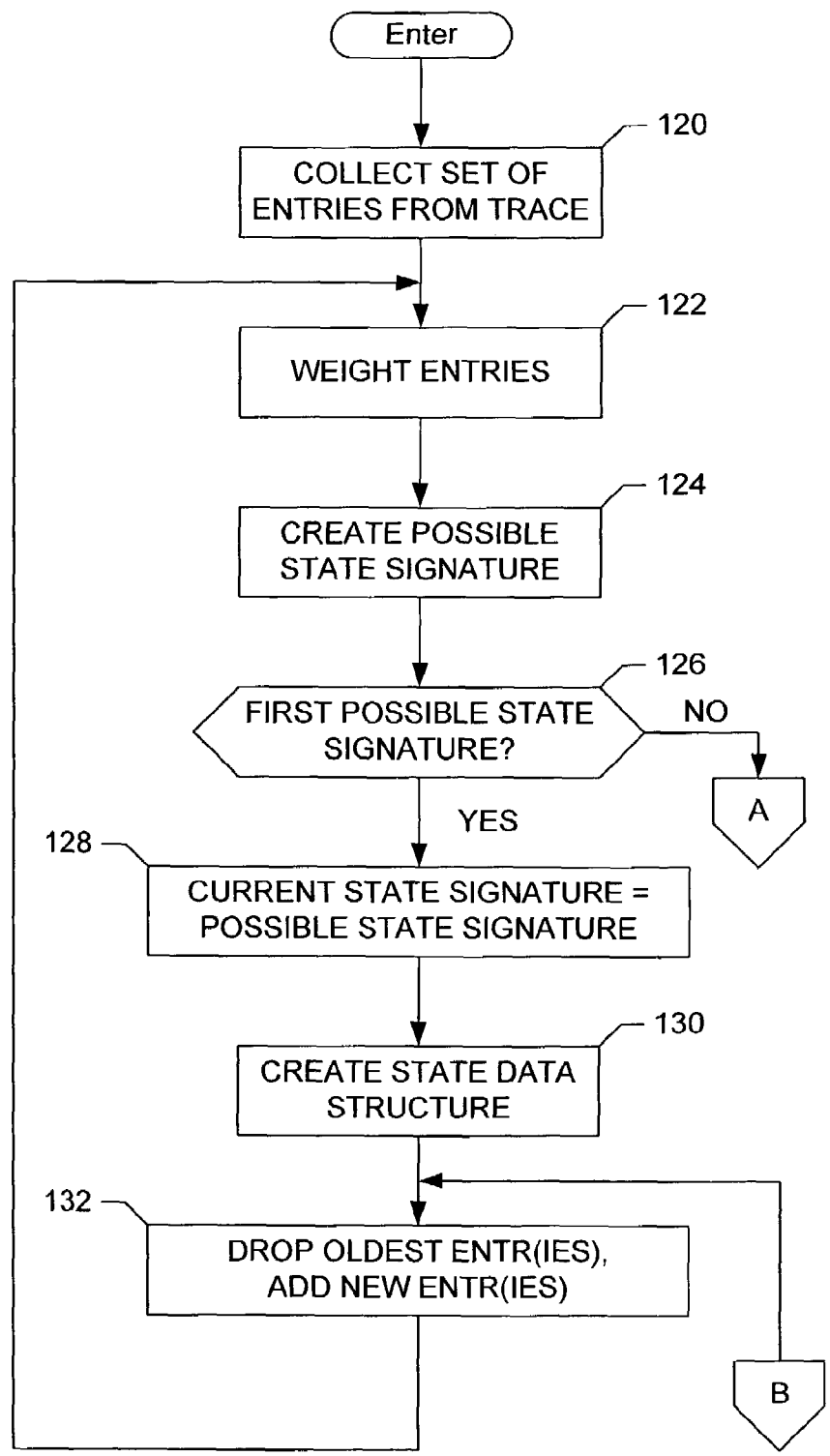
FIGS. 9A-9C are flowcharts illustrating example machine readable instructions for implementing the state identifier and predictor of the apparatus of FIG. 1.
Figure 9B:
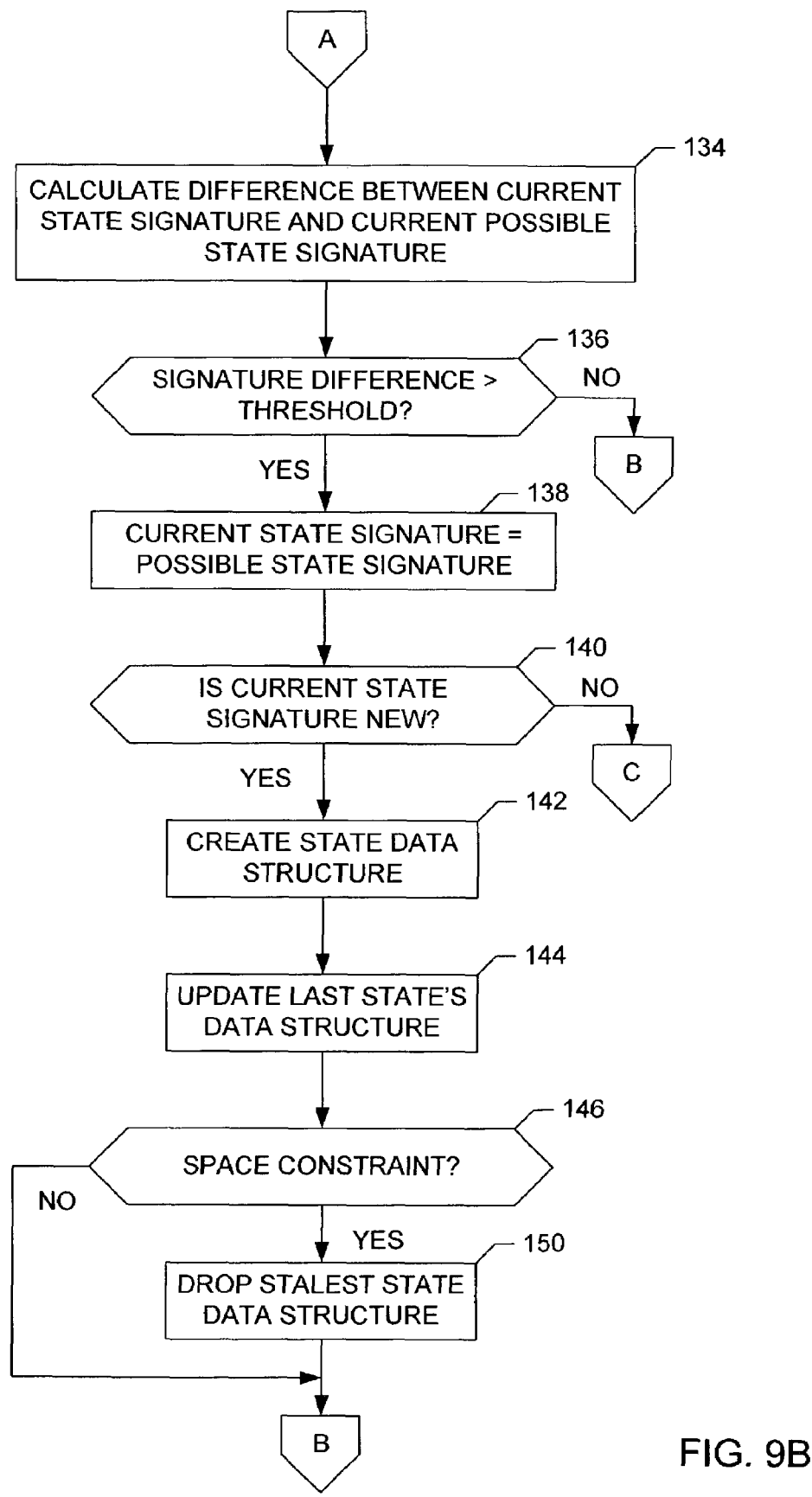
Figure 9C:
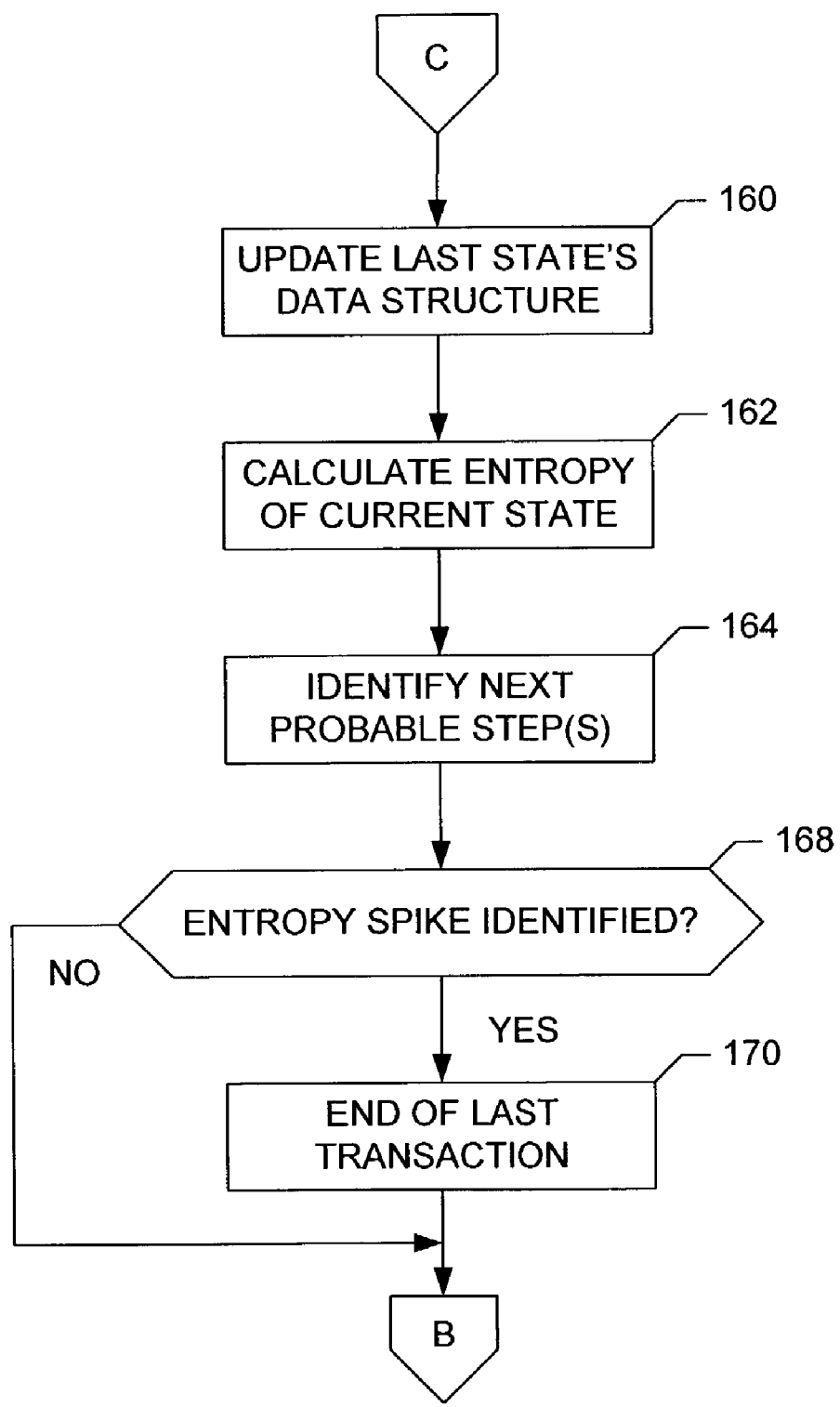

An example trace processing thread is shown in FIGS. 9A-9C. The illustrated trace processing thread begins at block 120 where the signature developer 16 obtains a set 26 of entries from the trace 18 created by the trace sampler 12. As explained above, the sets 26 of entries may be created in any number of ways to include any number of members. In the example of FIG. 3, each of the sets 26 include a series of sequential entries (i.e., no entries are skipped), and adjacent sets overlap (i.e., at least one of the entries is used in two adjacent sets. However, sets which skip some entries in the trace 18 and/or which do not overlap could alternatively be employed.

Once the entries to create a set 26 are retrieved from the trace 18 (block 120), the weight assigning engine 39 adjusts the values of the retrieved entries such that later entries are given greater weight than earlier entries (block 122). For example, the weight assigning engine 34 may apply an exponential decay function 36 (e.g., $f_1 = e^{-t/T}$) to the entries in the set (block 122).

Once the values of the entries have been weighted by the weight assigning engine 34 (block 122), the signature developer 16 maps the entries in the set 26 to an n-bit vector to create a possible state signature 28 for the set 26 (block 124). As explained above, the mapping of the entries in the set 26 to the possible state signature 28 may be performed using a hashing function.

After the possible state signature 28 is generated (block 124), the state distinguisher 38 determines whether the possible state signature 28 is the first possible state signature (block 126). If it is the first possible state signature (block 126), the first possible state signature is, by default, defined to be the first state signature. Thus, the state distinguisher 38 sets a current state signature variable equal to the possible state signature 28 (block 128) and creates a state data structure in the state array 44 for the first state (block 130). An example state data structure is shown in FIG. 5. The state distinguisher 38 may create the state data structure by creating the fields shown in FIG. 5, by writing the current state signature into the state signature field of the new state data structure, by setting the age field of the new state data structure equal to the current time or a proxy for the current time, and by setting the entropy field and the probability sub-array fields equal to zero.

The signature developer 16 then collects the next set 26 of entries for creation of a possible state signature 28 (block 132). In the illustrated example, the sets 26 used by the signature developer 16 to create the possible signatures 28 are overlapping. Thus, the signature developer 16 may create the next set 26 of entries by dropping the oldest entr(ies) from the last set 26 of entries and adding a like number of new entr(ies) to create a new current set 26 (block 132). Control then returns to block 122 where the entries in the new current set are weighted as explained above.

When at block 126, the current possible state signature is not the first possible state signature, control will skip from block 126 to block 134 (FIG. 9B). At block 134, the state distinguisher 38 calculates the difference between the current state signature (i.e., the value in the current state signature variable mentioned above), and the current possible state signature. The state distinguisher 38 then compares the computed difference to a threshold (e.g., the Hamming difference). If the computed difference exceeds the threshold (block 136), a program state change has occurred and control proceeds to block 138. If the computed difference does not exceed the threshold (block 136), the signature developer 16 collects the next set 26 of entries for creation of a possible state signature 28 (block 132, FIG. 9A) and control returns to block 122 as explained above. Thus, control continues to loop through blocks 122-136 until a program state change occurs.

Assuming for purposes of discussion that a program state change has occurred (block 136), the state distinguisher 38 sets the current state signature variable equal to the current possible state signature 28 (block 138). The state distinguisher 38 then examines the signatures present in the state array 44 to determine if the current state signature corresponds to the signature of a known state (block 140). If the current state signature is a known state signature, control advances to block 160 (FIG. 9C). Otherwise, if the current state signature is not a known state signature (i.e., the current state signature does not correspond to a state already existing in the state array 44), control advances to block 142 (FIG. 9B).

Assuming for purposes of discussion that the current state signature is not a known state signature (e.g., the current program state is a new program state) (block 140), the state distinguisher 38 creates a state data structure in the state array 44 for the first state (block 142) as explained above in connection with block 130.

The state transition monitor 48 then updates the last state's probability sub-array to reflect the transition from the last state to the new current state (block 144). Control then proceeds to block 146 where the state distinguisher 38 determines if the state array 44 has become full (i.e., if the newly added data structure used the last available spot in the state array). If the state array 44 is not full, control returns to block 132 (FIG. 9A) where the signature developer 16 collects the next set 26 of entries for creation of a possible state signature 28. Control then returns to block 122 as explained above.

If the state array is full (block 146), control advances to block 150 (FIG. 9B) where the state distinguisher 38 deletes the stalest state data structure from the state array 44. The stalest state data structure may be identified by comparing the usage fields of the state data structures appearing in the state array 44. Once the stalest state data structure is eliminated (block 150), control advances to block 132 where the signature developer 16 collects the next set 26 of entries for creation of a possible state signature 28. Control then returns to block 122 as explained above.

Assuming that the current state signature is a known state signature (block 140), control proceeds to block 160 (FIG. 9C). The state transition monitor 48 then updates the last state's probability sub-array to reflect the transition from the last state to the new current state (block 160). Control then proceeds to block 162 where the entropy calculator 50 calculates the entropy value of the current state. As explained above, the entropy value may be calculated in many different ways. For instance, in the illustrated example, the entropy value is calculated using the Shannon formula.

Once the entropy value is calculated (block 162), the event predictor 54 identifies the next most probable state(s) (block 164) by, for example, comparing the values in the probability sub-array of the state data structure of the current state. The event predictor 54 may then examine the entropy values of the last few states to determine if an entropy spike has occurred (block 168). If an entropy spike is identified (block 168), the event predictor 54 identifies the program state corresponding to the entropy spike as the last state of a macroscopic transaction (block 170). If an entropy spike is not identified (block 168), the end of a macroscopic transaction has not occurred. Accordingly, control skips block 170 and returns to block 132 (FIG. 9A).

Irrespective of whether control reaches block 132 via block 170 or directly from block 168, at block 132 the signature developer 16 collects the next set 26 of entries for creation of a possible state signature 28. Control then returns to block 122 as explained above. Control continues to loop through blocks 122-170 until the entire trace 18 has been processed. Once the entire trace 18 has been processed, the trace processing thread of FIGS. 9A-9C terminates.

Figure 10:
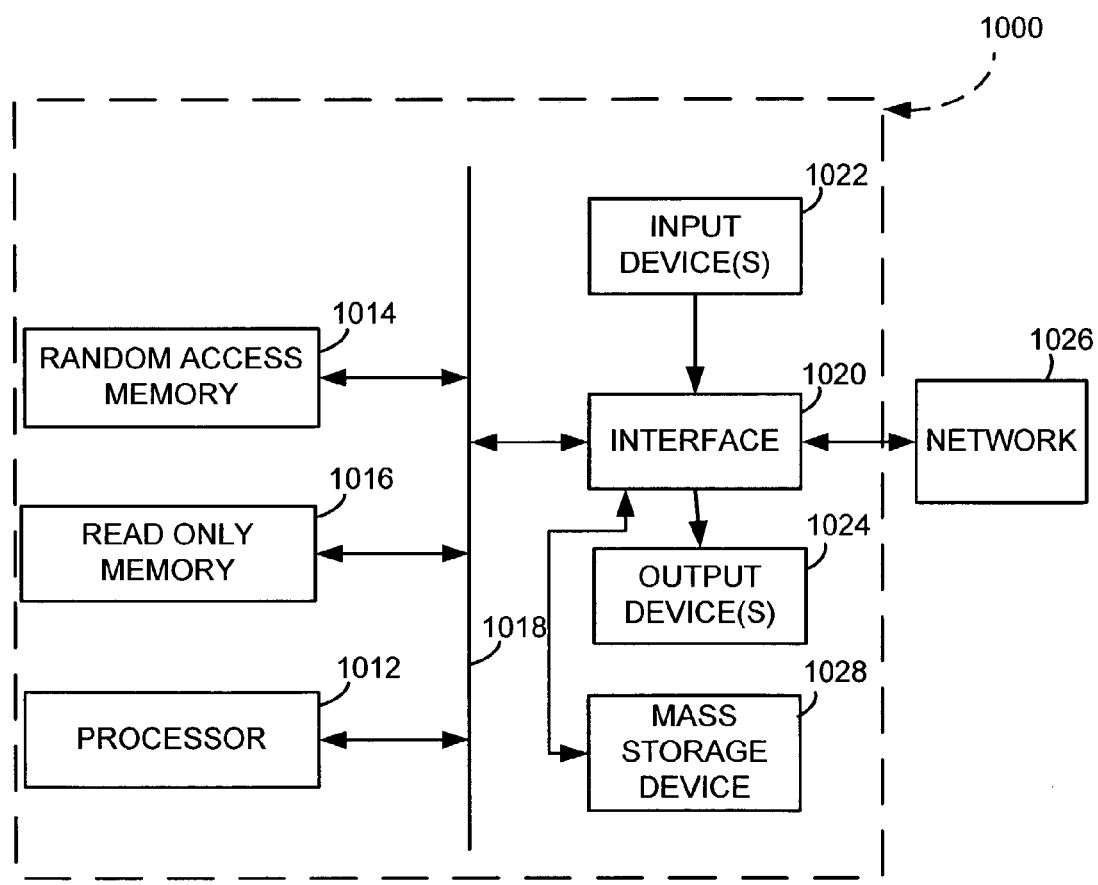
FIG. 10 is a schematic illustration of an example computer which may execute the programs of FIGS. 8 and 9A-9C to implement the apparatus of FIG. 1.

FIG. 10 is a block diagram of an example computer 1000 capable of implementing the apparatus and methods disclosed herein. The computer 1000 can be, for example, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012. For example, the processor 1012 can be implemented by one or more Intel® microprocessors from the Pentium® family, the Itanium® family, the XScale® family, or the Centrino™ family. Of course, other processors from other families are also appropriate.

The processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The computer 1000 also includes a conventional interface circuit 1020. The interface circuit 1020 may be implemented by any type of well known interface standard, such as an Ethernet interface, a universal serial bus (USB), and/or a third generation input/output (3GIO) interface.

One or more input devices 1022 are connected to the interface circuit 1020. The input device(s) 1022 permit a user to enter data and commands into the processor 1012. The input device(s) can be implemented by, for example, a keyboard, a mouse, a touch screen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the memory 44.

As an alternative to implementing the methods and/or apparatus described herein in a system such as the device of FIG. 10, the methods and/or apparatus described herein may alternatively be embedded in a structure such as processor and/or an ASIC (application specific integrated circuit).

From the foregoing, persons of ordinary skill in the art will appreciate that the above disclosed methods and apparatus may be implemented in a static compiler, a managed run-time environment just-in-time compiler (JIT), and/or directly in the hardware of a microprocessor to achieve performance optimization in executing various programs.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of detecting a macroscopic transaction comprising:
developing a trace of a program;
identifying a sequence of program states from the trace;
determining entropy values associated with the program states identified in the sequence;
identifying a macroscopic transaction based on the entropy values; and
wherein the identified macroscopic transaction is an ordered sequence of program states with an entropy-spiking ending state.

2. A method as defined in claim 1 wherein developing the trace comprises developing at least one of a program counter trace, an instruction pointer trace, a basic block trace, and a memory address trace.

3. A method as defined in claim 1 wherein identifying the sequence of program states comprises:
assigning possible state signatures to sets of entries in the trace;
selecting one of the possible state signatures as a first state signature;
comparing the first state signature to at least one subsequent one of the possible state signatures; and
if the at least one subsequent one of the possible state signatures differs from the first state signature by at least a predetermined amount, identifying the subsequent one of the possible state signatures as a second state signature.

4. A method as defined in claim 3 wherein assigning possible state signatures to sets of entries in the trace comprises:
developing a first possible state signature from a first set of entries in the trace; and
developing a second possible state signature from a second set of entries in the trace, the first set of entries partially intersecting the second set of entries.

5. A method as defined in claim 4 wherein developing the first possible state signature for the first set of entries in the trace comprises:
weighting members of the first set such that later members have greater weight than earlier members; and
mapping the weighted members to a bit vector signature.

6. A method as defined in claim 3 wherein the at least one subsequent one of the possible state signatures comprises the second state signature and at least one intervening possible signature between the first and second signatures, and the at least one intervening possible signature is ignored after the first and second signatures are identified.

7. A method as defined in claim 1 wherein determining the entropy values associated with the program states identified in the sequence comprises:
determining probabilities of transitioning from a first one of the program states to a plurality of the program states; and
convening the probabilities to an entropy value for the first program state.

8. A method as defined in claim 7 wherein the probabilities comprise at least one of moving averages and exponential moving averages.

9. A method as defined in claim 7 wherein convening the probabilities to the entropy value for the first program state comprises calculating a sum of (1) a product of (a) a probability of transitioning from the first program state to a second program state and (b) a logarithm of the probability of transitioning from the first program state to the second program state, and (2) a product of (a) a probability of transitioning from the first program state to a third program state and (b) a logarithm of the probability of transitioning from the first program state to the third program state.

10. A method as defined in claim 9 wherein convening the probabilities to an entropy value for the first program state further comprises multiplying the sum with a constant.

11. A method as defined in claim 1 wherein identifying the macroscopic transaction based on the entropy values comprises:
identifying a first spike in the entropy values as an end of the macroscopic transaction.

12. A method as defined in claim 1 further comprising indexing the program states by their respective times of first discovery.

13. A method as defined in claim 1 further comprising predicting at least one next probable program state to which a current program state is expected to transition.

14. An article of manufacture storing machine readable instructions which, when executed, cause a machine to:
develop a trace of a program;
identify a sequence of program states from the trace;
determine entropy values associated with the program states identified in the sequence;
identify a macroscopic transaction based on the entropy values; and
wherein the identified macroscopic transaction is an ordered sequence of program states with an entropy-spiking ending state.

15. An article of manufacture as defined in claim 14 wherein the trace comprises at least one of a program counter trace, an instruction pointer trace, a basic block trace, and a memory address trace.

16. An article of manufacture as defined in claim 14 wherein the machine readable instructions cause the machine to identify the sequence of program states by:
assigning possible state signatures to sets of entries in the trace;
selecting one of the possible state signatures as a first state signature;
comparing the first state signature to at least one subsequent one of the possible state signatures; and
if the at least one subsequent one of the possible state signatures differs from the first state signature by at least a predetermined amount, identifying the subsequent one of the possible state signatures as a second state signature.

17. An article of manufacture as defined in claim 16 wherein the machine readable instructions cause the machine to assign possible state signatures to sets of entries in the trace by:
developing a first possible state signature from a first set of entries in the trace; and
developing a second possible state signature from a second set of entries in the trace, the first set of entries partially intersecting the second set of entries.

18. An article of manufacture as defined in claim 17 wherein the machine readable instructions cause the machine to develop the first possible state signature for the first set of entries in the trace by:
weighting members of the first set such that later members have greater weight than earlier members; and
mapping the weighted members to a bit vector signature.

19. An article of manufacture as defined in claim 16 wherein the at least one subsequent one of the possible state signatures comprises the second state signature and at least one intervening possible signature between the first and second signatures, and the at least one intervening possible signature is ignored after the first and second signatures are identified.

20. An article of manufacture as defined in claim 14 wherein the machine readable instructions cause the machine to determine the entropy values associated with the program states identified in the sequence by:
determining probabilities of transitioning from a first one of the program states to a plurality of the program states; and
converting the probabilities to an entropy value for the first program state.

21. An article of manufacture as defined in claim 20 wherein the probabilities comprise at least one of moving averages and exponential moving averages.

22. An article of manufacture as defined in claim 20 wherein the machine readable instructions cause the machine to convert the probabilities to the entropy value for the first program state by calculating a sum of (1) a product of (a) a probability of transitioning from the first program state to a second program state and (b) a logarithm of the probability of transitioning from the first program state to the second program state, and (2) a product of (a) a probability of transitioning from the first program state to a third program state and (b) a logarithm of the probability of transitioning from the first program state to the third program state.

23. An article of manufacture as defined in claim 22 wherein the machine readable instructions cause the machine to convert the probabilities to an entropy value for the first program state by multiplying the sum with a constant.

24. An article of manufacture as defined in claim 14 wherein the machine readable instructions cause the machine to identify the macroscopic transaction based on the entropy values by identifying a first spike in the entropy values as an end of the macroscopic transaction.

25. An article of manufacture as defined in claim 14 the machine readable instructions cause the machine to index the program states by their respective times of first discovery.

26. An article of manufacture as defined in claim 14 wherein the instruction further cause the machine to predict at least one next probable program state to which a current program state is expected to transition.

27. An apparatus to identify program states comprising:
a trace sampler to develop a trace of a program;
a state identifier to identify a sequence of program states from the trace; and
a predictor to determine entropy values associated with the program states identified by the state identifier: wherein the predictor identifies a macroscopic transaction based on the entropy values, the identified macroscopic transaction is an ordered sequence of program states with an entropy-spiking ending state, and at least one of the trace sampler, the state identifier or the predictor comprises machine executable instructions stored on a tangible computer accessible storage medium.

28. An apparatus as defined in claim 27 wherein the trace comprises at least one of a program counter trace, an instruction pointer trace, a basic block trace, and a memory address trace.

29. An apparatus as defined in claim 27 wherein the state identifier further comprises:
a signature developer to develop possible state signatures for sets of entries in the trace;
a state distinguisher to identify program states based on the possible state signatures; and
a memory to store the state signatures of the program states identified by the state distinguisher.

30. An apparatus as defined in claim 29 wherein the signature developer develops a first possible state signature by mapping a first set of entries in the trace to a first bit vector signature.

31. An apparatus as defined in claim 30 wherein the signature developer develops a second possible state signature from a second set of entries in the trace by mapping the second set of entries to a second bit vector signature.

32. An apparatus as defined in claim 31 wherein the first set of entries partially intersects the second set of entries.

33. An apparatus as defined in claim 30 further comprising a weight assigning engine to weight members of the first set such that later members have greater weight than earlier members when mapping the first set of entries to the first bit vector signature.

34. An apparatus as defined in claim 29 wherein the state distinguisher identifies the program states by selecting one of the possible state signatures as a first state signature; comparing the first state signature to at least one subsequent one of the possible state signatures; and if the at least one subsequent one of the possible state signatures differs from the first state signature by at least a predetermined amount, identifying the subsequent one of the possible state signatures as a second state signature.

35. An apparatus as defined in claim 34 wherein the at least one subsequent one of the possible state signatures comprises the second state signature and at least one intervening possible signature between the first and second signatures, and the at least one intervening possible signature is discarded after the first and second signatures are identified.

36. An apparatus as defined in claim 29 wherein the memory stores a data structure including at least one of: a signature of a first program state, an age of the first program state, a usage frequency of the first program state, an entropy value of the first state, and a set of probabilities of transitioning from the first program state to a set of program states.

37. An apparatus as defined in claim 27 wherein the predictor further comprises:
a state transition monitor to calculate probabilities of transitioning from a first one of the program states to a plurality of program states; and
an entropy calculator to convert the probabilities to an entropy value for the first program state.

38. An apparatus as defined in claim 37 wherein the state transition monitor calculates the probabilities as exponential moving averages.

39. An apparatus as defined in claim 38 wherein the entropy calculator converts the probabilities to the entropy value for the first program state by calculating a sum of (1) a product of (a) a probability of transitioning from the first program state to a second program state and (b) a logarithm of the probability of transitioning from the first program state to the second program state, and (2) a product of (a) a probability of transitioning from the first program state to a third program state and (b) a logarithm of the probability of transitioning from the first program state to the third program state.

40. An apparatus as defined in claim 39 wherein the entropy calculator converts the probabilities to an entropy value for the first program state by multiplying the sum with a constant.

41. An apparatus as defined in claim 27 wherein the predictor further comprises an event predictor to identify a macroscopic transaction based on the entropy values.

42. An apparatus as defined in claim 41 wherein the event predictor identifies a first spike in the entropy values as an end of the macroscopic transaction.

43. An apparatus as defined in claim 27 wherein at least one of the state identifier and the entropy calculator indexes the program states by their respective times of first discovery.

44. An apparatus as defined in claim 27 wherein the predictor further comprises an event predictor to predict at least one next probable program state.

45. A system to identify program states comprising:
a trace sampler to develop a trace of a program;
a state identifier to identify a sequence of program states from the trace;
a predictor to determine entropy values associated with the program states identified by the state identifier and to identify an ordered sequence of program states with an entropy-spiking ending state based on the entropy values; and
a static random access memory to store the entropy values.

* * * * *

UNITED STATES PATENT AND TRADEMARK OFFICE
CERTIFICATE OF CORRECTION

| | | |
|---|---|---|
| PATENT NO. | : 7,647,585 B2 | Page 1 of 1 |
| APPLICATION NO. | : 10/424356 | |
| DATED | : January 12, 2010 | |
| INVENTOR(S) | : Mingqiu Sun | |

It is certified that error appears in the above-identified patent and that said Letters Patent is hereby corrected as shown below:

Col. 13, line 60 - Replace "convening" with "converting"

Col. 15, line 48 - After state identifier replace ":" with ";"

Signed and Sealed this

Twenty-third Day of March, 2010

David J. Kappos
*Director of the United States Patent and Trademark Office*